Patented May 5, 1942

2,281,692

UNITED STATES PATENT OFFICE 2,281,692

THIOCYANATES OF PHENYL ETHER

William F. Hester, Drexel Hill, and W E Craig, Philadelphia, Pa., assignors to Röhm & Haas Company, Philadelphia, Pa.

No Drawing. Application March 26, 1940, Serial No. 326,045

3 Claims. (Cl. 260—454)

This invention relates to thiocyanates of phenyl ether. These compounds have been found to possess a high degree of parasiticidal and ovicidal activity against diverse types of plant pests and other insects as well as against eggs of insects, and to have favorable properties in regard to odor, irritation, solubility, etc.

Thiocyanates of phenyl ethers may be prepared from the corresponding nitro or amine compounds. The nitro compound is first reduced to amine. The amine may then be diazotized. Upon the addition of a metal salt of thiocyanic acid and salts of such metals as copper, lead, or iron, the thiocyanate ether is formed. It is then separated and, if desired, purified.

Details of this procedure will be evident from the following example:

A mixture of 92.5 g. of $C_6H_5OC_6H_4NH_2$—4, 155 g. of sulfuric acid, and 75 ml. of water was diazotized at 0° C. with 35 g. of sodium nitrite in 100 ml. of water. There was then stirred into the preparation 125 g. of a molar cupric sulfate solution, a solution of 210 g. of ferrous sulfate in 500 ml. of water, and a solution of 53.4 g. of potassium thiocyanate in 110 ml. of water. The mixture was well stirred and left standing overnight. It was then extracted with benzene. The benzene layer was separated, washed with water, dried, and concentrated. The oil thus obtained was dissolved in acetone, filtered free from a small amount of insoluble material, and again concentrated. It was then taken up in petroleum ether, treated with carbon, and again concentrated.

The crude material thus obtained may be used as an insecticide or the 4-thiocyanophenyl ether may be further purified by vacuum distillation. The main product distilled at 148–158° C. at 2 mm., leaving a tarry residue. The distillate, on standing, formed crystals. These were recrystallized from methanol to give white diamond-shaped crystals, melting at 45–48° C.

Tests were made with the crude product for its insecticidal activity. In one series of tests three parts of the product was dissolved in three parts of pine oil and two parts of an oil-soluble sulfonated mineral oil. This preparation was diluted 1 to 300 with water to yield a spray emulsion. This was sprayed onto bush bean plants infested with red spiders and onto coleus infested with mealy bugs. Kills of 87% and 100% respectively resulted with no injury or only very slight injury to the plants. In another set of tests it gave a kill of 97% of large mealy bugs on coleus. A standard insecticidal spray under the same conditions gave kills of 43% of the red spiders and 70% of the mealy bugs.

The oil was tested as a stomach poison by depositing it on magnesium carbonate and spraying onto bean plants infested with bean beetle larvae. At 1% of toxicant there was very little feeding with a kill of 83%. At the same time 16% of the larvae were incapacitated. A control experiment with magnesium arsenate showed a 30% kill with 40% incapacitated. Since, at this high concentration, the material showed some signs of being corrosive, sprays were used at 0.16%. At this concentration there was still but little feeding and no injury to the plant. 60% of the larvae had left the plant in 48 hours and of these ⅛ were dead. A control experiment with magnesium arsenate showed 30% incapacitated and 30% dead.

Tests were also made for ovicidal action. Sprays containing 0.25% of the 4-thiocyanophenyl ether gave a 94% kill of bean weevil eggs and a 100% kill of meal worm eggs.

Other thiocyanates of phenyl ethers may also be prepared by the same method as shown above. These other new compounds also exhibit parasiticidal and ovicidal activity to a marked extent. Typical thiocyanates are:

$C_6H_5OC_6H_4SCN$—2
$C_6H_5OC_6H_3(SCN)_2$—2,4
2—$CH_3C_6H_4OC_6H_4SCN$—4
3—$CH_3C_6H_4OC_6H_4SCN$—4
$(CH_3)_2C_6H_3OC_6H_4SCN$—4
4—$(CH_3)_3CC_6H_4OC_6H_4SCN$—4
4—$(CH_3)_3CC_6H_4OC_6H_4SCN$—2
2—$C_6H_5C_6H_4OC_6H_4SCN$—4
4—$ClC_6H_4OC_6H_4SCN$—4
2—$ClC_6H_4OC_6H_4SCN$—4
2—NCS—4—$ClC_6H_3OC_6H_4SCN$—4
$C_6H_5SC_6H_4SCN$—4
4—$ClC_6H_4SC_6H_4SCN$—4

The ethers in which a sulfur atom replaces oxygen are likewise effective compounds and behave much like the oxygen ethers. The phenyl groups may be substituted with a variety of groups, such as alkyl, alkoxy, halogeno, etc.

We claim:

1. A phenoxybenzene having a thiocyanate group attached directly to an aromatic nucleus.
2. Phenoxyphenyl thiocyanate.
3. A thiocyanate of a member of the group consisting of phenoxybenzenes and phenylthiobenzenes in which a thiocyanate group is attached directly to an aromatic nucleus.

WILLIAM F. HESTER.
W E CRAIG.